United States Patent [19]

Ono

[11] Patent Number: 4,839,825
[45] Date of Patent: Jun. 13, 1989

[54] FRAME POSITIONING METHOD

[75] Inventor: Masaru Ono, Tokyo, Japan

[73] Assignee: Fuji Photo Film Co., Ltd., Kanagawa, Japan

[21] Appl. No.: 12,652

[22] Filed: Feb. 9, 1987

[30] Foreign Application Priority Data

Mar. 7, 1986 [JP] Japan .................................. 61-48555

[51] Int. Cl.⁴ .............................................. G06F 15/40
[52] U.S. Cl. ..................................... 364/518; 364/525; 355/53
[58] Field of Search ...................... 354/120; 353/27 A; 355/40, 41, 53; 364/518, 54, 525; 356/150, 399

[56] References Cited

U.S. PATENT DOCUMENTS

| | | | |
|---|---|---|---|
| 3,409,361 | 11/1968 | Hynes et al. | 355/42 |
| 4,033,684 | 7/1977 | Toriumi et al. | 353/27 A |
| 4,190,899 | 2/1980 | Smith et al. | 364/900 |
| 4,287,564 | 9/1981 | Swift et al. | 364/525 |
| 4,408,287 | 10/1983 | Parisot et al. | 364/518 |
| 4,443,858 | 4/1984 | Piaton | 364/518 |
| 4,501,489 | 2/1986 | Goulard et al. | 355/54 |
| 4,504,144 | 3/1985 | Trost | 356/150 |
| 4,529,281 | 7/1985 | De Roche et al. | 353/27 A |
| 4,704,796 | 11/1987 | Gauer | 33/1 B |

FOREIGN PATENT DOCUMENTS 0003445 1/1979 Japan ............................. 353/27 A

*Primary Examiner*—Gary V. Harkcom
*Assistant Examiner*—Phu K. Nguyen
*Attorney, Agent, or Firm*—Wenderoth, Lind & Ponack

[57] ABSTRACT

In a microfilm retrieval device, a frame which is at a position corresponding to its frame address is automatically retrieved and the object frame is projected on the screen of the reader. In such a device, the object frame must be accurately positioned at a positioning section irrespective of the types and size of microfilms and skew and pitch of frames. An arbitrary frame can be positioned and an accurate automatic retrieval can be realized even if no images are recorded in the reference frame or in the maximum address frames in both the row and the column, or if a microfilm is slanted in arrangement.

4 Claims, 3 Drawing Sheets

FRAME POSITIONING METHOD

BACKGROUND OF THE INVENTION

The present invention relates to a method for positioning a skewed frame in a microfiche retrieval device.

As is well-known, when automatically retrieving a frame recorded on a microfiche with a microfiche retrieval device, the target frame is automatically positioned by inputting the address of the frame (expressed by the numbers of frames from the reference frame in rows and columns) from a keyboard of the retrieval device to make the device convey the microfiche and to detect a frame corresponding to the address so as to be able to project the target frame on a reader screen.

FIG. 1 graphically shows an example of a frame arrangement of a microfiche which has hitherto been used. On this microfiche are recorded (m+1) frames along the horizontal (row) direction X and (n+1) frames along the vertical (column) direction Y from a "reference frame" $P_o$ (its address being (0,0)) which is the first address at the top left corner to a "span frame" $P_s$ (its address being (m, n)) which is the largest address at the right bottom corner in the figure. The pitch between adjacent frames is known since it has been specified when photographed. The value is $A_x$ in the direction of the X axis and $A_y$ in the direction of Y axis. The value is presumed to be manually inputted into the retrieval device in advance.

Conventionally, the reference frame $P_o$ which is the reference point for positioning frames is first set at the position of projection of the retrieval device. The device measures the distance from the mechanical origin (not shown) thereof by the amount of displacement (for example, the number of pulses) when the film is conveyed and calculates the position of the reference frame $P_o$ in terms of coordinate value $(X_o, Y_o)$. When the address of the frame to be retrieved, for example, (i,j) of "α" is inputted, the coordinate value $(X_i, Y_j)$ of the frame "α" is calculated from the following formula (1) using the coordinate value $(X_o, Y_o)$ of the reference frame $P_o$ and the reference pitches $A_x$ and $A_y$.

$$\left. \begin{array}{l} X_i = X_o + i \cdot A_x \\ Y_j = Y_o + j \cdot A_y \end{array} \right\} \quad (1)$$

Such a positioning method is only applicable to a microfiche whose frames are arranged in parallel with the directions in which the retrieval device moves (along X and Y axes). In practice, however, the arrangement of the frames is not necessarily in parallel with the moving axes of the retrieval device due to deviation of the film from the retrieval device when photographed, etc. This brings up a problem that even if the above mentioned positioning is carried out, the object frame cannot be accurately positioned on the reader screen and the position has to be further adjusted manually each time.

A method for positioning a frame which solves such problems is disclosed in the specification of U.S. Pat. No. 4,287,564. According to the disclosed method, as shown in FIG. 2 which corresponds to FIG. 1, the arrangement of frames slants against the axes (X and Y axes) of the retrieval device. It is assumed that the number {(m+1)×(n+1)} of frames is known. As explained above, the position of the reference frame $P_o$ is measured in terms of the coordinates $(X_o, X_o)$ while the position of the frame $P_M$ which as the maximum address along the same row as the reference frame $P_o$ (the address thereof (m,0)) is measured in terms of coordinate values $(X_m, Y_o')$. The displacement $L_x$ therebetween in the direction of the X axis and the deviation $\Delta_y$ in the direction of the Y axis due to skew are calculated from the coordinate values using the following formula (2).

$$\left. \begin{array}{l} L_x = X_m - X_o \\ \Delta_y = Y_o' - Y_o \end{array} \right\} \quad (2)$$

Using the displacement $L_x$, the deviation $\Delta_y$ in the direction Y axis and the number m of frames therebetween, the reference pitch $A_x'$, and a reference correction $\delta_y$ per frame are obtained from the following formula (3).

$$\left. \begin{array}{l} A_x' = L_x/m \\ \delta_y = \Delta_y/m \end{array} \right\} \quad (3)$$

Similarly, the position of a frame $P_N$ (its address being (0,n)) which has the maximum address in the same column as the reference frame $P_o$ is measured in terms of coordinate value $(X_o', Y_n)$. The displacement $L_y$ therebetween along the direction of Y axis and the deviation $\Delta_y$ due to skew are calculated from the coordinate values using the following formula (4).

$$\left. \begin{array}{l} L_y = Y_n - Y_o \\ \Delta_x = X_n' - X_o \end{array} \right\} \quad (4)$$

Using the displacement $L_y$, the deviation $\Delta_x$ along X axis and the number n of frames therebetween, the reference pitch $A_y$, and the reference correction $\delta_x$ per frame are calculated from the following formula (5).

$$\left. \begin{array}{l} A_y' = L_y/n \\ \delta_x = \Delta_x/n \end{array} \right\} \quad (5)$$

The reference correction $\delta_x$ along the direction of X axis is the amount of deviation between frames along the same row (the first row in this example) while the reference correction $\delta_y$ along the direction of Y axis is the amount of deviation between frames in the same column (the first column in this example). Thus, the reference correction $\delta_y$ in the direction of Y axis is accumulated at the row address while the reference correction $\delta_x$ in the direction of X axis at the column address, both of which increase respectively.

If the frame address of a frame to be retrieved, the frame address (i,j) of a frame "Σ" as shown in FIG. 2 for example is inputted, the coordinate value $(X_i, Y_j)$ of the frame Σ can be calculated using the coordinate values $(X_o, Y_o)$ of the reference frame $P_o$ and the reference pitches $A_x'$ and $A_y'$ obtained from the above mentioned formulas (3) and (5) and reference corrections $\delta_x$ and $\delta_y$ by the following formula (6).

$$\left.\begin{aligned}X_i &= X_o + i \cdot A_x' + j \cdot \delta_x \\ &= X_o + i \cdot \frac{X_m - X_o}{m} + j \cdot \frac{X_o' - X_o}{n} \\ Y_j &= Y_o + j \cdot A_y' - i \cdot \delta_y \\ &= Y_o + j \cdot \frac{Y_n - Y_o}{n} + i \cdot \frac{Y_o' - Y_o}{m}\end{aligned}\right\} \quad (6)$$

According to the method for positioning a frame, as explained above, the maximum frame distances $L_x$ and $L_y$ in both the row and the columns of the microfiche are measured, which are then respectively divided by the numbers m and n of frames therebetween to obtain the reference pitches $A_x'$ and $A_y'$. At the same time, the reference corrections $\delta_x$ and $\delta_y$ are obtained from the deviations $\Delta_x$ and $\Delta_y$ caused by slanting and corrections are made to the above reference pitches $A_x'$ and $A_y'$. Even if the frame images are slanted on a microfiche, the skew is corrected to position the object frame accurately.

In such a method for positioning a frame, the reference frame $P_o$ and the maximum address frames $P_M$ and $P_N$ of the row and the column have to be photographed. Furthermore, such frame images have to be very clear as they play the role of the reference. With some microfiches, however, only a letter for an index is recorded in the reference frame $P_o$, for example, or recorded on the maximum address frames $P_M$ and $P_N$ for the convenience of editing. Prior art method for positioning a frame as explained above was not applicable to such microfiches.

SUMMARY OF THE INVENTION

Accordingly, this invention was contrived to obviate the above mentioned problems encountered in the prior art and aims at providing a method for positioning a frame which can precisely position a frame corresponding to its address for automatic retrieval on a microfiche which has frames arranged so as to be skewed from the moving direction of the retrieval device by simply designating three arbitrary frames with images recorded thereon even if the microfiche does not have images recorded as the reference frame or the maximum address frames in the row and column.

According to another aspect of the present invention, for achieving the objects described above, there is provided a frame positioning method which can precisely position an arbitrary frame recorded on a microfiche by designating three arbitrary frames recorded on the microfiche mounted on a retrieval device, the three frames having different addresses and calculating from coordinates of the three frames on the retrieval device the reference frame coordinates, reference frame pitch and reference skew correction of the microfiche.

The nature, principle and utility of the invention will become more apparent from the following detailed description when read in conjunction with the accompanying drawings.

DETAILED DESCRIPTION OF THE INVENTION

According to the frame positioning method of the present invention, any frame can be precisely positioned corresponding to its address even if frames are arranegd so as to be skewed on a microfische from the direction of movement of the retrieval device as the method designates and precisely positions three arbitrary frames which have images recorded respectively, one of which has a different X coordinate from others and another of which has a different Y coordinate from others, and calculate the coordinates of the reference frame, the reference pitch and the reference correction.

Figure 1:
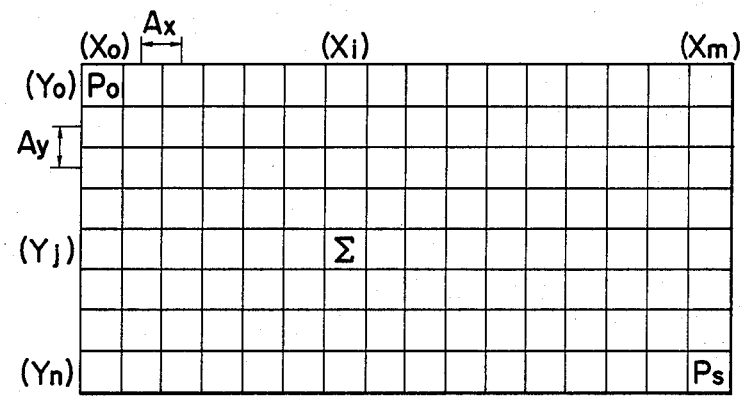
FIGS. 1 and 2 are graphs for explaining the prior art method of positioning a frame.
Figure 2:
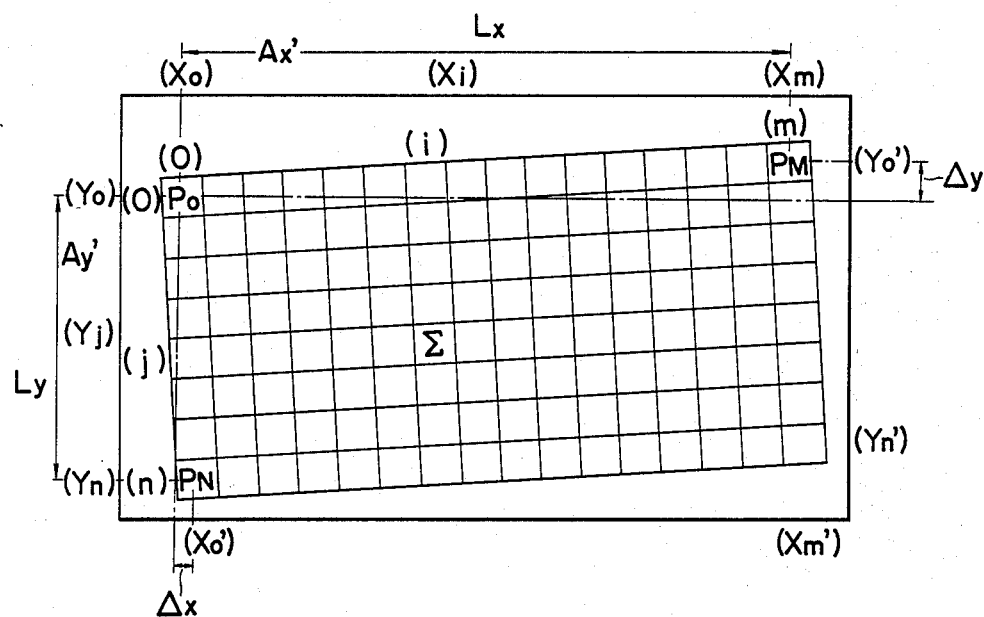
Figure 3:
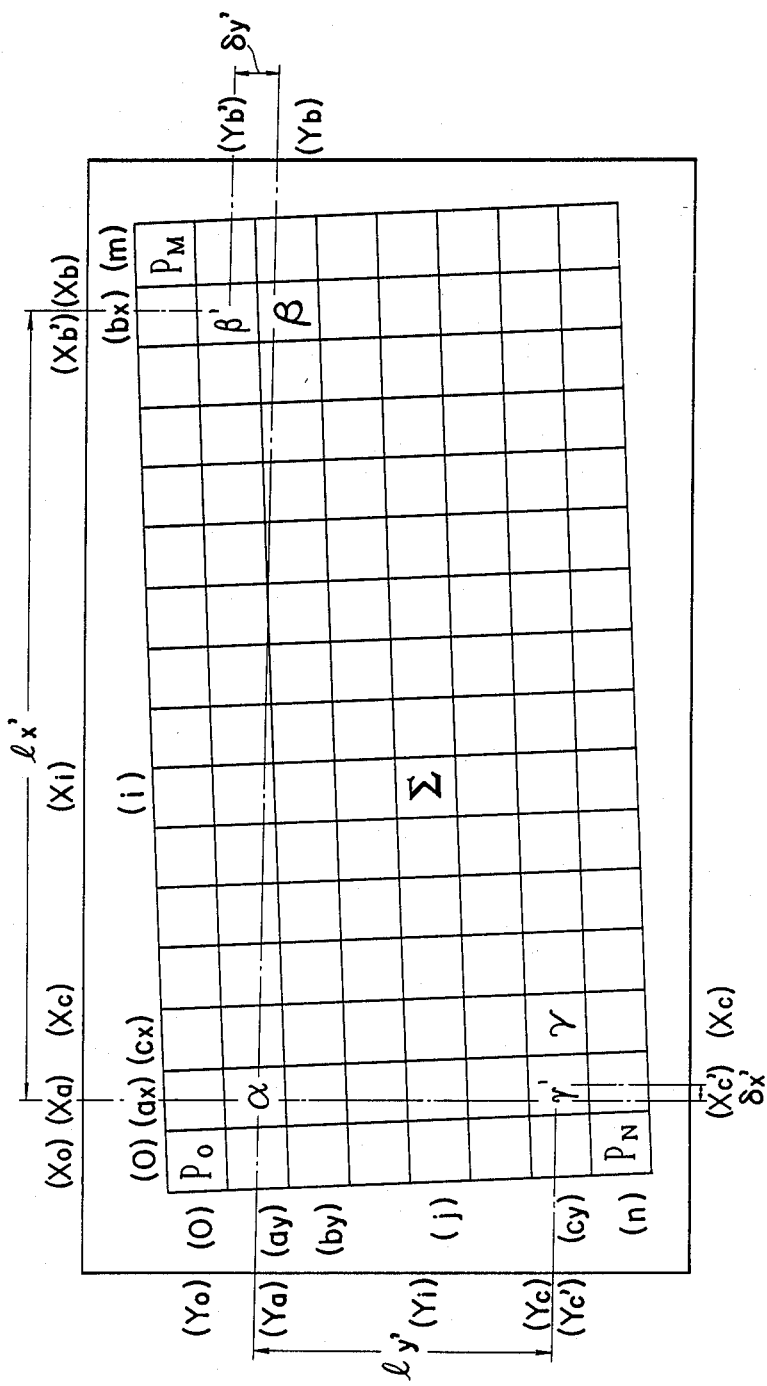
FIG. 3 is a graph for explaining the method of positioning a frame according to the present invention.

FIG. 3 is a graph to explain the present invention, and the same elements as those of FIG. 2 are denoted by the same reference numerals. In FIG. 3, when images are not recorded in the frame $P_o$ which is the "reference frame" and the maximum address frames $P_M$ and $P_N$ in the row and the column, and the above mentioned method for positioning a frame is not applicable, the mode of the microfiche retrieval device is changed to "Frame Adjustment Mode" and the three frames described above which has recorded images are designated. By accurately positioning these three frames, the coordinate value of the reference frame, the reference pitch and the reference correction are obtained, thus realizing positioning of an arbitrary frame the address of which is inputted. Though these three frames may be arbitrarily selected, it is preferable to designate the frames located as far apart as possible from each other in X-Y directions respectively due to the reason explained later in order to accurately position the frame to be retrieved. This example uses the first frame "α" which is closest to the reference frame $P_o$ and has images recorded therein, the second frame "α" which is closest to the maximum address frame $P_M$ along the row and which has images recorded therein, and the third frame "γ" which is closest to the maximum address frame along the column $P_N$ and which has images recorded therein.

Figure 4:
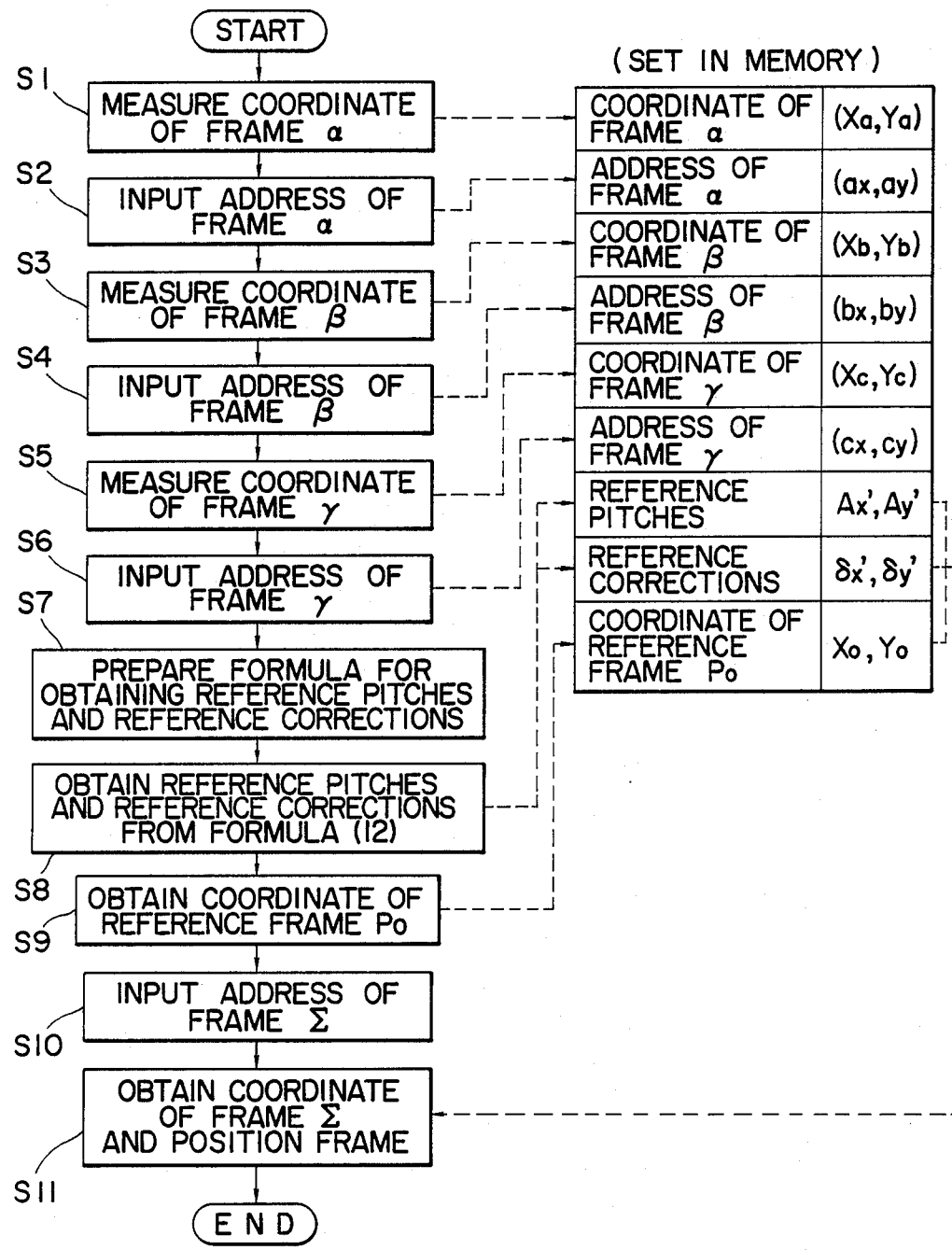
FIG. 4 is a flow chart for explaining the operation of the present invention.

FIG. 4 is a flow chart showing the operation of the method for positioning a frame according to the present invention. The invention will now be described referring to the chart.

When a frame "Σ" as shown in FIG. 3 is to be retrieved, the retrieval device is switched to the "Frame Pitch Adjustment Mode" and the operation of positioning a frame starts. The first frame α (the address thereof being $(a_x, a_y)$) and the second frame α (the address thereof being $(b_x, b_y)$) are designated. Then the first frame α is projected and accurately positioned at the center of the screen using a "Fine Adjustment Key" and the coordinates $(X_a, Y_a)$ thereof are measured while the address $(a_x, a_y)$ of the frame α is displayed on the display unit (not shown) (Step S1). The address $(a_x, a_y)$ of the first projected frame α is inputted from the keyboard (not shown) while the frame address $(a_x, a_y)$ and the corodinate values $(X_a, Y_a)$ of the first frame β are stored in the memory (not shown) using a "Start Key" (not shown) (Step S2). Similarly, the second frame β is projected and accurately positioned at the center of the screen using the "Fine Adjustment Key" and the coordinates $(X_b, Y_b)$ thereof are measured while the address $(b_x, b_y)$ of the frame β is displayed on the display (not shown) (Step S3). The address $(b_x, b_y)$ of the second projected frame $\beta$ is inputted from the keyboard while the frame address $(b_x, b_y)$ and the coordinates $(X_b, Y_b)$ of the second frame $\beta$ are stored in the memory using the "Start Key" (Step S4). Similarly, the third frame $\gamma$ is projected and accurately positioned at the center of the screen using "Fine Adjustment Key" and the coordinates $(X_c, Y_c)$ thereof are measured while the address $(c_x, c_y)$ of the frame $\gamma$ is displayed on the display (not shown) (Step S5). The address $(c_x, c_y)$ of the third frame $\gamma$ is inputted from the keyboard while the frame address $(c_x, c_y)$ and the coordinates $(X_c, Y_c)$ of the third frame $\gamma$ are stored in the memory using the "Start Key" (Step S6).

Since the row and the column addresses of the frame $\alpha$, $\beta$, $\gamma$ are different from each other, the aforementioned reference pitches $A_x', A_y$, and reference corrections $\delta_x, \delta_y$ cannot directly be obtained. A frame $\alpha'$ (its address being $(b_x, a_y)$) whose column address is the same as that of the first frame $\alpha$ is assumed for the second address $\beta$, and a frame $\gamma'$ (its address being $(a_x, c_y)$) whose row address is the same as that of the first frame $\gamma$ is assumed for the third frame in a manner to make the coordinate values thereof to be $(X_b', Y_b'), X_c', Y_c')$ respectively. Displacements $l_x'$ and $l_y'$ between the two frames $\alpha$ and $B'$ and between the two frames $\alpha$ and $\gamma'$ and the deviation $\Delta_y'$ in the direction of the Y axis and the deviation $\Delta_x'$ in the direction of the X axis are calculated from the coordinate values thereof using the following formulas (7) and (8) (Step S7).

$$\left. \begin{array}{l} l_x' = X_b' - X_a \\ \Delta_y' = Y_b' - Y_a \end{array} \right\} \quad (7)$$

$$\left. \begin{array}{l} l_y' = X_c' - X_a \\ \Delta_x' = Y_c' - Y_a \end{array} \right\} \quad (8)$$

By the following formulas (9) and (10), the reference pitch $A_x$, and the reference correction $\delta_y'$ are calculated using the displacement $l_x'$, deviation $\Delta_y'$ and number $(b_x - a_x)$ of frames along the row between the two frames $\alpha, \beta'$ while the reference pitch $A_y'$, and the reference correction $\delta_x'$ are calculated using the shift amount $l_y'$, the deviation $\Delta_x'$ and the number $(c_x - a_x)$ of frames in the column between the two frames $\alpha$ and $\gamma$ (Step S8).

$$\left. \begin{array}{l} A_x' = l_x'/(b_x - a_x) \\ \delta_y' = \Delta_y'/(b_x - a_x) \end{array} \right\} \quad (9)$$

$$\left. \begin{array}{l} A_y' = l_y'/(c_y - a_y) \\ \delta_x' = \Delta_x'/(c_y - a_y) \end{array} \right\} \quad (10)$$

The coordinates $(X_b, Y_b)$ and $(X_c, Y_c)$ of the second frame $\beta$ and the third frame $\gamma$ can be expressed by the following formula (11) using the reference pitches $A_x'$, $A_y'$ and the reference corrections $\delta_x', \delta_y'$ obtained from the coordinate values $(X_a, Y_a)$ of the first frame $\alpha$ and the formulas (7) through (10).

$$\left. \begin{array}{l} X_b = X_a + (b_x - a_x) \cdot A_x' + (b_y - a_y) \cdot \delta_x' \\ Y_b = Y_a + (b_y - a_y) \cdot A_y' + (b_x - a_x) \cdot \delta_y' \\ X_c = X_a + (c_x - a_x) \cdot A_x' + (c_y - a_y) \cdot \delta_x' \\ Y_c = Y_a + (c_y - a_y) \cdot A_y' + (c_x - a_x) \cdot \delta_y' \end{array} \right\} \quad (11)$$

From the above formula (11), the reference pitches $A_x', A_y'$ and reference corrections $\delta_x', \delta_y'$ are calculated as in the formula (12), and are stored in the memory (Step S8).

$$\left. \begin{array}{l} A_x' = \dfrac{(c_y - a_y) \cdot (X_b - X_a) - (b_y - a_y) \cdot (X_c - X_a)}{(c_y - a_y) \cdot (b_x - a_x) - (b_y - a_y) \cdot (c_x - a_x)} \\ A_y' = \dfrac{(c_x - a_x) \cdot (Y_b - Y_a) - (b_x - a_x) \cdot (Y_c - Y_a)}{(c_x - a_x) \cdot (b_y - a_y) - (b_x - a_x) \cdot (c_y - a_y)} \\ \delta_x' = \dfrac{(c_x - a_x) \cdot (X_b - X_a) - (b_x - a_x) \cdot (X_c - X_a)}{(c_x - a_x) \cdot (b_y - a_y) - (b_x - a_x) \cdot (c_x - a_x)} \\ \delta_y' = \dfrac{(c_y - a_y) \cdot (Y_b - Y_a) - (b_y - a_y) \cdot (Y_c - Y_a)}{(c_y - a_y) \cdot (b_x - a_x) - (b_y - a_y) \cdot (c_x - a_x)} \end{array} \right\} \quad (12)$$

The coordinates $(X_o, Y_o)$ of the reference frame $P_o$ are calculated from the following formulas (13) using the first frame $\alpha$ and the reference pitches $A_x'$, and $A_y'$ and the reference corrections $\delta_x', \delta_y$ obtained from the formula (12), and are stored in the memory (Step S9).

$$\left. \begin{array}{l} X_o = X_a - a_x \cdot A_x' - a_y \cdot \delta_x' \\ Y_o = Y_a - a_y \cdot A_y' - a_x \cdot \delta_y' \end{array} \right\} \quad (13)$$

The coordinate value of reference frames, reference pitches and reference corrections necessary for positioning a frame are thus obtained. When the frame address of the target frame, for example address $(i,j)$ of the frame "$\Sigma$" as shown in FIG. 3, is inputted (Step S10), the coordinates $(X_i, Y_j)$ of the frame $\Sigma$ can be calculated by the collowing formula (14) using the coordinates $(X_o, Y_o)$ of the frame $P_o$, the reference pitches $A_x', A_y'$ and the reference corrections $\delta_x', \delta_y'$ (Step S11).

$$\left. \begin{array}{l} X_i = X_o + i \cdot A_x' + j \cdot \delta_x' \\ Y_i = Y_o + j \cdot A_y' + i \cdot \delta_y' \end{array} \right\} \quad (14)$$

According to the present method for positioning a frame, three arbitrary imaged frames on a microfiche are designated and the coordinate values thereof are measured as explained above. At the same time, the frame with the same row address as the first frame and the frame with the same column address with that of the first frame are assumed for the second and third frames respectively. The displacements therebetween $l_x'$ and $l_y'$ and deviation $\Delta_x'$ and $\Delta_y'$ are measured, and the reference pitches $A_x'$ and $A_y'$ and the reference corrections $\delta_x'$ and $\delta_y'$ are obtained by dividing the above displacements and deviation by the number of frames. If there is any error inthe reference pitches $A_x'$ and $A_y'$ and reference corrections $\delta_x'$ and $\delta_y'$ which will be the reference values for retrieving a frame, such error will be accumulated at the time of retrieval and the accurate positioning of the object frame becomes impossible. In order to minimize such an error, it is preferable to choose three frames which are as far apart as possible as the three arbitrary frames. The accumulation of errors in a frame can be avoided in this way, making the error extremely small to enable the accurate positioning of any target frame. In addition, even if the type of the microfiche fluctuates or the dimension thereof may vary, the error will be too small to accumulate in each frame, enabling an accurate positioning of the object frame. The desired frame can be precisely positioned by repeating the above steps S10 to S11.

The above mentioned embodiment illustrates an example of a frame arrangement slanting in one direction. In case of the frame arrangement slanting in the opposite direction, the same steps can be followed by reversing the plus and minus of the correction terms. The calculation will have a result reserved in positive/negative relationship.

In the above mentioned embodiment, the coordinates of the reference frame are calculated based on the arbitrarily selected three frames, and then the object frame is positioned based on the reference frame. But the coordinates of the frames and thus positioned object frame may be stored each time without obtaining the reference frame, and the next frame may be positioned based on the frame data.

Furthermore, each frame address and coordinate values of the three frames obtained as explained above, the coordinate value of the reference frame, reference frame pitch, correction of skew of the microfiche, etc. can be stored even after the completion of retrieval. If such data are read out and utilized when retrieving a microfiche of the same size having a similar skew, retrieval can be executed promptly and easily without obtaining the reference frames address, reference frame pitch and skew correction each time as explained above.

In the method of positioning a frame according to the present invention, even if images are not recorded in the reference frame and maximum address frame of the row and column, an arbitrary frame may be positioned precisely according to the address thereof even on a microfiche inclined from the arrangement of the frames and may be retrieved automatically simply by designating three arbitrary frames proximal to the reference frame and the maximum address frames in both row and column directions, and measuring the coordinate values thereof after accurately positioning each of these three frames.

It should be understood that many modifications and adaptations of the invention will become apparent to those skilled in the art and it is intended to encompass such obvious modifications and changes in the scope of the claims appended hereto.

What is claimed is:

1. A frame positioning method which can precisely position a frame recorded on a microfiche, each frame having addresses and coordinates defining its location on the microfiche, comprising the steps of:
    selecting three arbitrary frames recorded on the microfiche mounted on a retrieval device, the three arbitrary frames having images recorded thereon and having different addresses;
    determining coordinates of the three arbitrary frames;
    calculating reference frame coordinates, a reference frame pitch, and a reference skew from the previously determined coordinates;
    positioning a frame on the microfiche in accordance with the reference frame coordinates, the reference frame pitch, and said reference skew.

2. A frame positioning method as claimed in claim 1, wherein images are recorded on said three arbitrary frames with different addresses, and wherein a value in an X axis of one of the frames differs from the others and a value in a Y axis of another of the frames differs from the others.

3. A frame positioning method as claimed in claim 2, wherein a first frame is a frame selected from those frames which are closest to a reference frame, a second frame is a frame selected from those frames which are closest to a highest row address and a third frame is a frame selected from those frames which are closest to a highest column address.

4. A frame positioning method as claimed in claim 3, wherein said second frame is selected so as to have a same column address as said first frame and said third frame is selected so as to have a same row address as said first frame, and said reference frame pitch and reference correction are obtained after obtaining displacements between frames and deviations in both X and Y axes.

* * * * *